United States Patent [19]
Gildersleeve et al.

[11] Patent Number: 5,665,235
[45] Date of Patent: Sep. 9, 1997

[54] SUPPORTED FIBROUS WEB ASSEMBLY

[75] Inventors: Michael R. Gildersleeve, Nesconset; Tony Alex, Merrick; Thomas C. Gsell, Glen Cove, all of N.Y.; M. JoAnna Abes, Mountainside, N.J.

[73] Assignee: Pall Corporation, East Hills, N.Y.

[21] Appl. No.: 437,806

[22] Filed: May 9, 1995

[51] Int. Cl.⁶ .................................................. B01D 39/16
[52] U.S. Cl. .......................... 210/503; 210/505; 210/508
[58] Field of Search ................................ 210/490, 503, 210/504, 505, 506, 507, 508, 509; 428/219, 137

[56] References Cited

U.S. PATENT DOCUMENTS

| | | |
|---|---|---|
| 3,019,186 | 1/1962 | Powers . |
| 3,246,767 | 4/1966 | Pall et al. . |
| 3,616,149 | 10/1971 | Wincklhofer et al. . |
| 4,111,815 | 9/1978 | Walker et al. . |
| 4,186,235 | 1/1980 | Bramwell . |
| 4,196,027 | 4/1980 | Walker et al. . |
| 4,212,733 | 7/1980 | Goto et al. . |
| 4,340,479 | 7/1982 | Pall . |
| 4,360,433 | 11/1982 | Walker et al. . |
| 4,536,440 | 8/1985 | Berg . |
| 4,758,251 | 7/1988 | Swedo et al. ................. 55/16 |
| 4,855,108 | 8/1989 | Masuda et al. . |
| 4,935,139 | 6/1990 | Davidson et al. . |
| 4,950,454 | 8/1990 | Masuda et al. . |
| 5,063,108 | 11/1991 | Whetstone . |
| 5,089,122 | 2/1992 | Chmiel . |
| 5,108,827 | 4/1992 | Gessner . |

FOREIGN PATENT DOCUMENTS

| | | |
|---|---|---|
| 241221 | 10/1987 | European Pat. Off. . |
| 515045 | 11/1992 | European Pat. Off. . |
| 4344819 | 7/1994 | Germany . |
| 5-96110 | 4/1993 | Japan . |
| WO92/11405 | 7/1992 | WIPO . |
| WO94/11556 | 5/1994 | WIPO . |

OTHER PUBLICATIONS

"Textile Fibers Hoechst Celanese Corporation: Celbond® Staple Fibers" (Mar. 1991).

*Primary Examiner*—W. L. Walker
*Attorney, Agent, or Firm*—Leydig, Voit & Mayer, Ltd.

[57] ABSTRACT

The present invention provides a supported fibrous web assembly comprising a support material adhered to a nonwoven web of multicomponent fibers comprising a first polymer and a second polymer such that the second polymer is present on at least a portion of the surface of the multicomponent fibers and has a softening temperature below the softening temperatures of the first polymer and the support material, wherein the supported fibrous web assembly has a water flow rate of at least about 20% of the water flow rate of the nonwoven web of multicomponent fibers alone. The present inventive supported fibrous web assembly can further comprise a second fibrous web, which is adhered to the nonwoven web of multicomponent fibers such that the nonwoven web of multicomponent fibers is positioned between the second fibrous web and the support material, and wherein the supported fibrous web assembly has a water flow rate of at least about 20% of the water flow rate of the second fibrous web alone. The present invention also provides a filter element comprising a housing and such a supported fibrous web assembly, as well as a method of preparing such a supported fibrous web assembly and methods of using such a supported fibrous web assembly.

28 Claims, No Drawings

SUPPORTED FIBROUS WEB ASSEMBLY

TECHNICAL FIELD OF THE INVENTION

The present invention pertains to a supported fibrous web assembly, i.e., a fibrous web adhered to a support material. The present invention also pertains to a method of preparing such a supported fibrous web assembly, as well as methods of using such a supported fibrous web assembly.

BACKGROUND OF THE INVENTION

Filtration media have been used for the filtration of fine particles from fluids, particularly liquids, for many years. Such filtration media are available in a variety of materials to meet particular filtration requirements. Fibrous webs, such as those described in U.S. Pat. No. 4,021,281, are particularly well-suited to the filtration of certain particulate matters from fluids.

Fibrous webs possess the ability to remove certain particles from fluids but unfortunately suffer from a lack of mechanical strength, e.g., they are readily deformed. As a result, a support material is often mated with such a fibrous web in order to provide a filtration medium with satisfactory mechanical characteristics. This is particularly the case when the filtration medium is used in high shear or pulsed flow environments or is subjected to high backflow pressures.

There have been many attempts at mating fibrous webs to suitable support materials. These attempts have included melt-blowing a fibrous web directly onto a support material, thermally laminating a fibrous web directly onto a support material, and utilizing an adhesive to secure a fibrous web to a support material. Each of these techniques is not without problems, such as weak fibrous web-support adherence, significant blockage of the pores of the fibrous web and/or support material, alteration of the physical characteristics of the fibrous web, and the introduction of possible contamination sources.

Thus, there remains a need for a method for adhering a fibrous web to the surface of a support material, particularly a rigid support material, which method provides secure adherence of the fibrous web to the support material without substantially adversely affecting either the fibrous web or the support material. The present invention seeks to provide such a method and the resulting supported fibrous web assembly. These and other objects and advantages of the present invention, as well as additional inventive features, will be apparent from the description of the invention set forth herein.

BRIEF SUMMARY OF THE INVENTION

The present invention provides a supported fibrous web assembly comprising a support material adhered to a nonwoven web of multicomponent fibers. The multicomponent fibers comprise a first polymer and a second polymer such that the second polymer is present on at least a portion of the surface of the multicomponent fibers and has a softening temperature below the softening temperatures of the first polymer and the support material. The supported fibrous web assembly has a water flow rate of at least about 20% of the water flow rate of the nonwoven web of multicomponent fibers alone. The present inventive supported fibrous web assembly can further comprise a second fibrous web, which is adhered to the nonwoven web of multicomponent fibers such that the nonwoven web of multicomponent fibers is positioned between the second fibrous web and the support material, and wherein the supported fibrous web assembly has a water flow rate of at least about 20% of the water flow rate of the second fibrous web alone. The present invention also provides a filter element comprising a housing and such a supported fibrous web assembly, as well as a method of preparing such a supported fibrous web assembly and methods of using such a supported fibrous web assembly.

DESCRIPTION OF THE PREFERRED EMBODIMENTS

The supported fibrous web assembly of the present invention comprises a support material adhered to a nonwoven web of multicomponent fibers wherein the multicomponent fibers comprise a first polymer and a second polymer such that the second polymer is present on at least a portion of the surface of the multicomponent fibers and has a softening temperature below the softening temperatures of the first polymer and the support material, and the supported fibrous web assembly has a water flow rate of at least about 20% of the water flow rate of the nonwoven web of multicomponent fibers alone. The supported fibrous web assembly can further comprise a second fibrous web, which is adhered to the nonwoven web of multicomponent fibers such that the nonwoven web of multicomponent fibers is positioned between the second fibrous web and the support material, and wherein the supported fibrous web assembly has a water flow rate of at least about 20% of the water flow rate of the second fibrous web alone.

Nonwoven Web of Multicomponent Fibers

The nonwoven web of multicomponent fibers can comprise any suitable amounts of the first and second polymers such that the second polymer is present on at least a portion of the surface of the multicomponent fibers and has a softening temperature below the softening temperatures of the first polymer, the second fibrous web (if present), and the support material. Typically, the multicomponent fibers comprise at least about 10 wt. % of a first polymer having a first softening temperature and no more than about 90 wt. % of a second polymer having a second softening temperature which is lower than the first softening temperature, as well as the softening temperatures of the second fibrous web (if present) and support material. The multicomponent fibers preferably comprise at least about 30 wt. %, more preferably at least about 40 wt. % (e.g., about 40–60 wt. %), of the first polymer and no more than about 70 wt. %, more preferably no more than about 60 wt % (e.g., about 60–40 wt. %), of the second polymer. The multicomponent fibers preferably comprise a core of the first polymer and at least a partially surrounding surface coating of the second polymer. More preferably, the multicomponent fibers comprise a core of the first polymer and a sheath of the second polymer (i.e., the second polymer forms a continuous coating over the surface of the core of the first polymer).

The multicomponent fibers of the nonwoven web can be prepared from any suitable polymers. Preferably, at least the second polymer, and more preferably also the first polymer, are thermoplastic polymers. Most preferably, the multicomponent fibers of the nonwoven web will be prepared from suitable polyolefins and/or polyesters. Suitable polymers include polyester, polyethylene, polypropylene, and polymethylpentene. The first polymer is preferably polyester, with the second polymer preferably being polyethylene. The multicomponent fibers of the nonwoven web can be prepared by any suitable means and formed into a nonwoven web by any suitable means, such as the conventional Fourdrinier paper making processes. While the multicomponent fibers are preferably bicomponent fibers, i.e., fibers prepared from only two polymers, the multicomponent fibers can be prepared from more than two polymers, i.e., the first and/or second polymers as described herein can be thought of as polymer blends. The multicomponent fiber can also comprise a suitable adhesive promoter, e.g., a silane coupling agent, particularly when the support material is a metal, e.g., stainless steel.

The particular combination of polymers for the multicomponent fibers should be chosen such that the softening temperatures of the first and second polymers differ sufficiently enough that the softening of the second polymer can be effected without adversely affecting the first polymer, as well as the second fibrous web (if present) and support material. Thus, first polymer, second fibrous web (if present), and support material preferably have softening temperatures at least about 20° C. higher, more preferably at least about 50° C. higher, than the softening temperature of the second polymer. The second polymer will typically have a softening temperature of about 110° C. to about 200° C., more typically about 110° C. to about 150° C. While the melting temperatures of the second fibrous web (if present), support material, and first and second polymers of the nonwoven web of multicomponent fibers can be considered, the softening temperatures provide a more practical measure of the temperatures at which deformation and/or melt flow of the various elements of the present inventive supported fibrous web assembly can take place.

The multicomponent fibers used to form the nonwoven web preferably have a mean or average diameter of about 50 μm or less. More preferably, at least 90%, most preferably substantially all, of the multicomponent fibers forming the nonwoven web have a diameter of about 50 μm or less. The multicomponent fibers forming the nonwoven web will be typically about 5–50 μm in diameter, more usually about 10–30 μm in diameter. The multicomponent fibers can have any suitable length, e.g., about 0.5–8 cm.

The nonwoven web of multicomponent fibers can have any suitable sheet (or basis) weight. The nonwoven web of multicomponent fibers preferably has a sheet weight of at least about 20 $g/m^2$, more preferably between about 20 $g/m^2$ and about 200 $g/m^2$, and most preferably between about 20 $g/m^2$ and about 100 $g/m^2$.

The nonwoven web of multicomponent fibers can be of any suitable thickness and generally will be at least about 50 μm thick. The nonwoven web of multicomponent fibers is preferably of sufficient thickness so as to provide the desired peel strength to the supported fibrous web assembly. Further, the nonwoven web of multicomponent fibers should be of sufficient thickness to provide the desired physical separation between the second fibrous web, when present, and the support material so as to allow for sufficient lateral flow (e.g., sideways or edgewise flow) through the nonwoven web of multicomponent fibers, thereby minimizing the pressure drop across the supported fibrous web assembly. The nonwoven web of multicomponent fibers preferably has a thickness of less than about 5000 μm, more preferably less than about 2500 μm, and most preferably about 50 to about 1000 μm.

The nonwoven web of multicomponent fibers should be as uniform as possible as regards thickness. Preferably, the nonwoven web of multicomponent fibers will have a thickness variability of no more than about ±10%, more preferably no more than about ±9%, which represents about 3 standard deviations of the mean thickness of the nonwoven web. Most preferably, the nonwoven web of multicomponent fibers will have a thickness variability of no more than about ±5%.

The nonwoven web of multicomponent fibers can have any suitable air permeability. Typically, the nonwoven web of multicomponent fibers will have an air permeability of about 30,000 to about 500,000 1 pm/$m^2$. The nonwoven web of multicomponent fibers preferably has an air permeability of about 100,000 to about 300,000 1 pm/$m^2$.

Support Material

The support material can be any suitable material, desirably a material that is more rigid than the nonwoven web of multicomponent fibers and second fibrous web (if present). The support material desirably has a flexural rigidity (ASTM D 1388-64 (reapproved 1975; editorial changes in 1975 and 1976) cantilever test) of at least about 10 times, preferably at least about 50 times, more preferably at least about 100 times, e.g., about 500 times or more, and most preferably at least about 1000 times, the flexural rigidity of the nonwoven web of multicomponent fibers and second fibrous web (if present). The support material also preferably has a tensile strength at least about 5 times, and more preferably at least about 10 times, the tensile strength of the nonwoven web of multicomponent fibers and second fibrous web (if present). In addition, the softening temperature of the support material should be greater than the softening temperature of the second polymer of the multicomponent fibers.

The support material will be typically a polymeric material or a metal. Suitable polymeric materials include polyamide (e.g., nylon), polypropylene, polyethersulfone (PES), polysulfone (PSO), polyetherimide (PEI), polyetheretherketone (PEEK), and polyetherketone (PEK). Suitable metallic materials include metals, such as aluminum, and alloys, such as stainless steel. The support material can be in any suitable form, e.g., sheet, fibrous, mesh, and the like.

The support material can be porous, such that the filtered fluid flows through the support material, or nonporous, such that the filtered fluid flows laterally through the nonwoven web of multicomponent fibers, e.g., between the second fibrous web (if present) and the support material. The support material is preferably porous, particularly a stainless steel porous sheet, e.g., with chemically etched holes therethrough.

The support material can be rendered more amenable to adherence to the nonwoven web of multicomponent fibers by toughening the surface of the support material. For example, the support material, particularly when it is a metal, such as stainless steel, can be rendered more amenable to adherence to the nonwoven web of multicomponent fibers by etching and/or subjecting the support material to heat-treatment or other oxidative surface treatment.

Second Fibrous Web

The present inventive fibrous web assembly can comprise a second fibrous web, i.e., a web of fibers in addition to the nonwoven web of multicomponent fibers. Any suitable nonwoven fibrous web can be utilized as the second fibrous web.

The second fibrous web can be comprised of any suitable materials and can be of any suitable construction. The second fibrous web can comprise multicomponent fibers or single component fibers and, thus, can be the same or different than the nonwoven web of multicomponent fibers. The second fibrous web preferably comprises single component fibers. The second fibrous web can be in the form of a nonwoven fibrous web or a woven (including mesh or screen) fibrous web, preferably a nonwoven fibrous web.

Generally, when a second fibrous web is utilized, it will be the primary filtration medium, with the nonwoven web of multicomponent fibers being a means of adhering the second fibrous web to the support material.

Assembly Method

The adherence of the nonwoven web of multicomponent fibers to the support material and second fibrous web (if present) is effected by subjecting the nonwoven web of multicomponent fibers to a temperature above the softening temperature of the second polymer but below the softening temperatures of the first polymer, second fibrous web (if present), and support material. In other words, the nonwoven web of multicomponent fibers is subjected to a temperature sufficient to at least partially soften the second polymer without significantly softening the other components of the supported fibrous web assembly such that the second polymer can melt flow a sufficient extent to effect the desirable adhesion between the nonwoven web of multicomponent fibers and the second fibrous web (if present) and support material.

Thus, the present invention provides a method of preparing a supported fibrous web assembly, wherein the method comprises (a) positioning a nonwoven web of multicomponent fibers in contact with a support material to form a supported fibrous web assembly, wherein the multicomponent fibers comprise a first polymer and a second polymer such that the second polymer is present on at least a portion of the surface of the multicomponent fibers and has a softening temperature below the softening temperatures of the first polymer and the support material, (b) subjecting the nonwoven web of multicomponent fibers to a temperature above the softening temperature of the second polymer and below the softening temperatures of the first polymer and the support material, and (c) applying pressure to the supported fibrous web assembly while the nonwoven web of multicomponent fibers is at a temperature above the softening temperature of the second polymer such that the support material is adhered to the nonwoven web of multicomponent fibers, and the supported fibrous web assembly has a water flow rate at least about 20% of the water flow rate of the nonwoven web of multicomponent fibers alone.

The present inventive method can further comprise positioning the nonwoven web of multicomponent fibers between the support material and a second fibrous web, subjecting the nonwoven web of multicomponent fibers to a temperature above the softening temperature of the second polymer and below the softening temperatures of the first polymer, the second fibrous web, and the support material, and applying pressure to the supported fibrous web assembly while the nonwoven web of multicomponent fibers is at a temperature above the softening temperature of the second polymer such that the support material and the second fibrous web are adhered to the nonwoven web of multicomponent fibers, and the supported fibrous web assembly has a water flow rate at least about 20% of the water flow rate of the second fibrous web alone.

The nonwoven web of multicomponent fibers can be subjected to the desired softening temperature by any suitable means, including, but not limited to, hot platens, induction, microwave, radio frequency, convection, and the like. For example, the present inventive assembly can be placed in an oven or on a hot plate or, more preferably, run through heated nip rollers and/or between heated conveying belts, so long as a desirable level of adhesion, e.g., peel strength, is obtained between the layers of the assembly without undue pore blockage or blinding. Similarly, a portion of the assembly can be brought to the desired temperature and then combined with the remaining portion(s) of the assembly.

Most preferably, heat is applied to the assembly for a period sufficient for the nonwoven web of multicomponent fibers to reach equilibrium at the desired temperature. The length of time for such heating will depend in part on the method by which heat is applied and the precise physical characteristics of the components of the assembly.

While the nonwoven web of multicomponent fibers is at the elevated temperature, i.e., at a temperature above the softening temperature of the second polymer, the assembly is preferably subjected to the application of a suitable amount of pressure, which can be effected in any suitable manner, e.g., by nip rolls and the like. The amount of pressure applied to the heated assembly, which is needed to effect good adherence of the various components of the assembly, will similarly vary, depending on the precise method being employed to effect adherence of the assembly components and the physical nature of those components. Generally, an applied pressure of about 5–1500 kPa will be sufficient, with about 10–1000 kPa applied pressure being more typically utilized.

The pressure will need to be applied for a sufficient time to allow the second polymer of the multicomponent fibers forming the nonwoven web of multicomponent fibers to deform or melt flow to effect the desired degree of adhesion between the components of the assembly, without adversely affecting, e.g., deforming and/or causing to melt flow, the remainder of the supported fibrous web assembly. Generally, the desired pressure can be applied for about 1–60 seconds, preferably for about 1–30 seconds.

Care should be exercised to ensure that the applied pressure is not effected in such a manner that adversely affects the supported fibrous web assembly. In addition, pressure should not be applied to the supported fibrous web assembly so as to render the nonwoven web of multicomponent fibers nonporous or to adversely affect the absorption and fluid flow properties across the nonwoven web of multicomponent fibers (lateral and/or vertical flow) to a significant extent, although, in some instances, it may be desirable to render purposefully a portion of the nonwoven web of multicomponent fibers nonporous, i.e., impermeable to fluid flow, so as to, for example, control fluid flow. Such an approach is particularly useful in fluid-tight sealing the edges of the supported fibrous web assembly so as to prevent fluid leakage and to direct the flow of fluid to a suitable outlet.

The supported fibrous web assembly is desirably prepared such that the assembly exhibits sufficiently high permeability and adhesion characteristics. In particular, the supported fibrous web assembly preferably has a water flow rate of at least about 50%, more preferably at least about 70%, and most preferably at least about 90%, of the water flow rate of the nonwoven web of multicomponent fibers alone and/or of the water flow rate of the second fibrous web (if present). The water flow rate is the quantity of water per time period per pressure unit per assembly surface area unit and is expressed herein in terms of $ml/min/kPa/m^2$. The water flow rate is measured, if possible, at an applied pressure of 7 kPa, and all of the water flow rate values reported herein reflect measurements at such an applied pressure.

Moreover, the supported fibrous web assembly preferably has second fibrous web-nonwoven web of multicomponent fibers and nonwoven web of multicomponent fibers-support material peel strengths of at least about 50 kg/m, more preferably at least about 100 kg/m, and most preferably at least about 150 kg/m, when dry and, most preferably, also after soaking in water at 90° C. for 30 minutes. The supported fibrous web assembly will ideally have second fibrous web-nonwoven web of multicomponent fibers and nonwoven web of multicomponent fibers-support material peel strengths, which are sufficiently high such that the supported fibrous web assembly cannot be peeled apart without destroying the second fibrous web and/or support material.

The present inventive supported fibrous web assembly desirably has a flexural rigidity (ASTM D 1388-64) of at least about 10 times, preferably at least about 50 times, more preferably at least about 100 times, e.g., about 500 times or more, and most preferably at least about 1000 times, the flexural rigidity of the nonwoven web of multicomponent fibers and second fibrous web (if present).

The present inventive supported fibrous web assembly preferably can withstand shear rates, such as those encountered in dynamic filtration, of at least about 200,000 $sec^{-1}$, more preferably at least about 400,000 $sec^{-1}$, and most preferably at least about 500,000 $sec^{-1}$. Similarly, the present inventive supported fibrous web assembly desirably can withstand backflow pressures of at least about 100 kPa, preferably at least about 200 kPa, more preferably at least about 400 kPa, and most preferably at least about 500 kPa.

Methods of Use

The present inventive supported fibrous web assembly can be used for any suitable purpose, e.g., for any purpose for which a conventional supported fibrous assembly could be used. Since the present inventive supported fibrous web assembly has excellent adhesion characteristics while retaining good permeability characteristics, the present inventive supported fibrous web assembly can also be used in applications and environments in which a conventional supported fibrous web assembly may not be suitable, such as in high shear or pulsed flow environments or in applications where the supported fibrous web assembly is subjected to high backflow pressures. The present inventive supported fibrous web assembly is useful in crossflow filtration devices and applications and is particularly well-suited in dynamic filtration devices and applications, especially those involving rotary and vibratory dynamic filtration devices.

Thus, the present invention provides a filter element comprising a housing and the supported fibrous web assembly of the present invention. Such a filter element can include the present inventive supported fibrous web assembly in any suitable configuration, including, for example, in a sheet form wherein the support material is a plate, a pleated configuration wherein the support material is a mesh, or a tubular configuration wherein the support material is a tube. The present invention also provides a method of filtering a fluid, which method comprises passing a fluid through the supported fibrous web assembly of the present invention.

EXAMPLES

The following examples further illustrate the present invention and, of course, should not be construed as in any way limiting its scope.

Example 1

This example illustrates the superior permeability and adhesion characteristics of the present inventive supported fibrous web assembly.

In particular, the permeability was measured of a single component fibrous nonwoven web alone (sample 1A), the single component fibrous nonwoven web mated but not bound to a stainless steel support (sample 1B), a multicomponent fibrous nonwoven web alone (sample 1C), the multicomponent fibrous nonwoven web mated but not bound to the stainless steel support (sample 1D), the multicomponent fibrous nonwoven web mated and bound to the stainless steel support (sample 1E), the single component fibrous nonwoven web mated but not bound to the stainless steel support with the multicomponent fibrous nonwoven web therebetween (sample 1F), and the single component fibrous nonwoven web bound to the stainless steel support with the multicomponent fibrous nonwoven web therebetween (samples 1G). The peel strengths of the various bound embodiments, to the extent applicable, were also determined.

The single component fibrous nonwoven web utilized in this series of experiments was Reemay® 2016 (Snow Filtration Co. (Cincinnati, Ohio)). The nonwoven web had a sheet weight of about 46 $g/m^2$ and was a spunbonded, randomly oriented, fibrous nonwoven web composed of 100% polyester fibers. The thickness of the nonwoven web was about 229 μm (ASTM D 1777-64 (reapproved 1975) test method), while the air permeability of the web was about 274,300 1 $pm/m^2$ (ASTM D 737-75 test method). The tensile strength of the nonwoven web was about 661 kg/linear m in the machine direction and about 482 kg/linear m in the cross-machine direction (ASTM D 1117-77 test method).

The stainless steel support was a 304 stainless steel plate with a thickness of about 305 μm and having chemically etched holes of about 380 μm in diameter. These holes, through which the permeate is drained away, were spaced about 900 μm on center apart, thus providing an open area of about 16% for permeation. The stainless steel plate surface was chemically roughened during hole etching, which enhanced bonding. The plate surface was further made more favorable for bonding by exposing the plate to about 370° C. for about 1 hour in an oven.

The multicomponent fibrous nonwoven web which was utilized in this series of experiments was Celbond® T105 (Hoechst-Celanese, Salisbury, N.C.). The T105 nonwoven web comprised 100% bicomponent, concentrically oriented fibers having a linear low density polyethylene sheath with a melting temperature of 127° C. and a polyester core with a melting temperature of 256° C. The T105 nonwoven web had a sheet weight of about 68 $g/m^2$ and was a wet laid, randomly oriented, fibrous nonwoven web composed of about 20 μm diameter×1.27 cm length, Celbond® T105 fibers. The thickness of the T105 nonwoven web was about 406 μm (ASTM D 1777-64 test method), while the air permeability of the web was about 167,600 1 $pm/m^2$ (ASTM D 737-75 test method). The tensile strength of the T105 nonwoven web was about 107 kg/linear m in the machine direction and about 71 kg/linear m in the cross-machine direction (ASTM D 1117-77 test method).

Filtrate flux was determined by measuring the flow of deionized water at ambient temperature (e.g., about 20°–25° C.) at an applied pressure of about 7 kPa. The water flow rate through the single component fibrous nonwoven web alone was about 425 1 $pm/m^2$ or about 62 1 $pm/m^2/kPa$. The permeability of a particular assembly incorporating the single component fibrous nonwoven web was calculated by determining the water flow rate at about 7 kPa applied pressure through the assembly and dividing that flow rate by the flow rate through the membrane alone (i.e., about 425 1 $pm/m^2$ or about 62 1 $pm/m2/kPa$) to obtain a percent permeability. Similarly, the water flow rate through the multicomponent fibrous nonwoven web alone was about 436 1 $pm/m^2$ or about 63 1 $pm/m2/kPa$. The permeability of a particular assembly incorporating the multicomponent fibrous nonwoven web, in the absence of the single component fibrous nonwoven web, was calculated by determining the water flow rate at about 7 kPa applied pressure through the assembly and dividing that flow rate by the flow rate through the membrane alone (i.e., about 436 l pm/m² or about 63 l pm/m2/kPa) to obtain a percent permeability.

The bonding of the single component fibrous nonwoven web (fabric), multicomponent fibrous nonwoven web (interlayer), and/or stainless steel plate (support) was effected by use of a laminator. The supported fibrous web assembly was properly layered together and then fed into the laminator, which was comprised of heated upper and lower conveying belts through which the assembly was passed. The temperature of the belts was set at 160°–170 ° C, i.e., above the melting temperature of the sheath component of the bicomponent fibers and below the melting temperature of the core component of the bicomponent fibers, as well as the single component fibrous nonwoven web and stainless steel support. The distance between the two belts, referred to as the belt height, which was 0.9 mm, was adjusted to the approximate the thickness of the unbonded assembly so as to uniformly heat the assembly prior to nip pressure application. Thermal equilibrium was achieved as the assembly traveled down the heated conveying belts, with the dwell time prior to the application of nip pressure (which is determined by the velocity of the conveying belts) being about 60 seconds. The gap between the lower conveying belt and the nip roll, i.e., the nip height, was 0.6 mm, and the nip roll pressure was either about 21 kPa (for sample 1E) or about 186 kPa (for sample 1G). After exiting the nip roll, the supported fibrous web assembly was allowed to cool at ambient temperature.

The peel strength between two adhered layers was determined in accordance with ASTM D 2724-79 by peeling the two layers back from each other in opposite directions at an angle of 180°. The peel strength, for purposes of describing the present inventive supported fibrous web assembly, is the load required to peel one of the two adhered layers away from the other layer (which is fixed) at a rate of 5.08 cm/min at a constant rate of elongation within a 2.54 cm wide by 10.16 cm long strip of the adhered sheets. The peel strength of adhered layers was also determined after each test strip had soaked in water at 90° C. for 30 minutes.

The bonding conditions and physical characteristics of the various assemblies evaluated in these experiments are set forth in Table 1.

As is apparent from the data set forth in Table 1, the present inventive supported fibrous web assembly has excellent permeability and adhesion characteristics. In particular, the present inventive supported fibrous web assembly (as exemplified by samples 1E and 1G) retains a significant portion of the permeability of the unbound assembly (as exemplified by samples 1D and 1F, respectively), and even of the single component or multicomponent fibrous nonwoven webs alone (as exemplified by samples 1A and 1C, respectively), while having excellent adhesion characteristics as evidenced by the peel strength values. Indeed, the existence of the multicomponent fibrous nonwoven web has little adverse effect on permeability as illustrated by a comparison of the permeabilities of the present inventive supported fibrous web assembly involving the single and multicomponent fibrous nonwoven webs with the stainless steel support (as exemplified by sample 1G) and the single component fibrous nonwoven web and stainless steel support only (as exemplified by sample 1B).

The supported fibrous web assemblies (as exemplified by samples 1E and 1G) had excellent wet and dry peel strength characteristics as between the multicomponent fibrous nonwoven web and the stainless steel support. The supported nonwoven web assembly (as exemplified by sample 1G) also exhibited good wet and dry peel strength characteristics as between the multicomponent fibrous nonwoven web and the single component fibrous nonwoven web.

Example 2

This example illustrates the poor permeability characteristics of a supported fibrous web assembly prepared in a manner similar to that of Example 1, except using a single component fibrous nonwoven web as an interlayer between the single component fibrous nonwoven web and stainless steel support recited in Example 1, contrary to the dictates of the present invention. A supported fibrous web assembly similar to those of Example 1 was prepared using the laminator (except involving a nip pressure of about 186 kPa) to effect the bonding of the single component fibrous nonwoven web (fabric) of Example 1, a single component fibrous nonwoven web of lower melting temperature (interlayer), and the stainless steel plate (support) of Example 1. The single component fibrous nonwoven web

TABLE 1

| Sample | Assembly | Bonding Method | Permeability (%) | Dry Peel Strength: Support-Interlayer Web (kg/m) | Wet Peel Strength: Support-Interlayer Web (kg/m) | Dry Peel Strength: Interlayer Web-Fabric (kg/m) | Wet Peel Strength: Interlayer Web-Fabric (kg/m) |
|---|---|---|---|---|---|---|---|
| 1A | single component nonwoven web only | unbonded | 100 | N/A | N/A | N/A | N/A |
| 1B | single component nonwoven web and support only | unbonded | 97 | N/A | N/A | N/A | N/A |
| 1C | multi-component nonwoven web only | unbonded | 100 | N/A | N/A | N/A | N/A |
| 1D | multi-component nonwoven web and support only | unbonded | 100 | 0 | 0 | N/A | N/A |
| 1E | multi-component nonwoven web and support only | laminator | 90 | 127 | 102 | N/A | N/A |
| 1F | complete | unbonded | 95 | 0 | 0 | 0 | 0 |
| 1G | complete | laminator | 91 | 152 | 75 | 50 | 45 |

Notes:
"0" indicates the lack of any significant adhesion between the layers
"N/A" indicates that the particular peel strength test was not applicable interlayer was of polypropylene and is commercially available as Typar® T135 (Midwest Filtration Company, Hamilton, Ohio). The single component fibrous nonwoven web interlayer had a sheet weight of about 31 g/m² and was a spunbonded fibrous nonwoven web composed of fibers having a mean diameter of about 23 μm. The thickness of the single component fibrous nonwoven web interlayer was about 254 μm (ASTM D 1777-64 test method), while the air permeability of the web was about 76,200 lpm/m² (ASTM D 737-75 test method). The tensile strength of the single component fibrous nonwoven web interlayer was about 482 kg/linear m in the machine direction and about 268 kg/linear m in the cross-machine direction (ASTM D 1117-77 test method).

The permeability and peel strength of the assembly were measured as described in the same manner set forth in Example 1, and the resulting values are set forth in Table 2. For comparison purposes, the same assembly in unbonded form was similarly tested, and the resulting values are also set forth in Table 2. In particular, filtrate flux was determined by measuring the flow of deionized water at ambient temperature (e.g., about 20°–25° C.) at an applied pressure of about 7 kPa. The water flow rate through the unbonded assembly was about 425 lpm/m² or about 62 1 pm/m²/kPa. The permeability of the bonded assembly was calculated by determining the water flow rate at about 7 kPa applied pressure through the assembly and dividing that flow rate by the flow rate through the membrane alone (i.e., about 425 1 pm/m² or about 62 1 pm/m²/kPa) to obtain a percent permeability.

ing a dwell time of about 300 seconds prior to the application of a nip pressure of about 186 kPa) to effect the bonding of the single component fibrous woven web (fabric), the multicomponent fibrous nonwoven web (interlayer) of Example 1, and the stainless steel plate (support) of Example 1. The single component fibrous woven web fabric was of polyester and is commercially available as PeCap® 7-5/2 (Tetko, Inc., Briarcliff Manor, N.Y.). The single component fibrous woven web fabric had a sheet weight of about 64 g/m² and was a simple over and under pattern square weave screening composed of fibers having a mean diameter of about 33 μm. The thickness of the single component fibrous woven web fabric was about 65 μm, while the mesh opening was about 5 μm, with a 2% open area.

The permeability and peel strength of the assembly were measured as described in the same manner set forth in Example 1, and the resulting values are set forth below in Table 3. For comparison purposes, the same assembly in unbonded form was similarly tested, and the resulting values are also set forth in Table 3. In particular, filtrate flux was determined by measuring the flow of deionized water at ambient temperature (e.g., about 20–°25° C.) at an applied pressure of about 7 kPa. The water flow rate through the unbonded assembly was about 230 1 pm/m² or about 33 1 pm/m2/kPa. The permeability of the bonded assembly was calculated by determining the water flow rate at about 7 kPa applied pressure through the assembly and dividing that flow rate by the flow rate through the membrane alone (i.e., about 230 1 pm/m² or about 33 1 pm/m²/kPa) to obtain a percent permeability.

TABLE 2

| Sample | Assembly | Bonding Method | Permeability (%) | Dry Peel Strength: Support-Interlayer Web (kg/m) | Wet Peel Strength: Support-Interlayer Web (kg/m) | Dry Peel Strength: Interlayer Web-Fabric (kg/m) | Wet Peel Strength: Interlayer Web-Fabric (kg/m) |
| --- | --- | --- | --- | --- | --- | --- | --- |
| 2A | complete | unbounded | 100 | 0 | 0 | 0 | 0 |
| 2B | complete | laminator | 0 | * | * | * | * |

Notes:
"0" indicates the lack of any significant adhesion between the layers
"*" indicates that the layers could not be peeled apart in a reliable manner without damage As is apparent from the data set forth in Table 2, while the supported fibrous web assembly utilizing a nonwoven web interlayer of a single component fiber had good peel strength characteristics, such an assembly had very poor permeability characteristics. Indeed, in this particular comparative example, there was no significant permeability. Although the single component fiber consisted of polypropylene, the same results are expected for other single component fibers, such as polyethylene which has a lower melting temperature than polypropylene.

Example 3

This example illustrates the good permeability and adhesion characteristics of another embodiment of the present inventive supported fibrous web assembly, in particular of a supported fibrous web assembly similar to those of Example 1 except utilizing a single component fibrous woven web, rather than a nonwoven web, in conjunction with a stainless steel plate and a multicomponent fibrous nonwoven web interlayer.

A supported fibrous web assembly similar to those of Example 1 was prepared using the laminator (except involv-

TABLE 3

| Sample | Assembly | Bonding Method | Permeability (%) | Dry Peel Strength: Support-Interlayer Web (kg/m) | Dry Peel Strength: Interlayer Web-Fabric (kg/m) |
| --- | --- | --- | --- | --- | --- |
| 3A | complete | unbonded | 100 | 0 | 0 |
| 3B | complete | laminator | 78 | 152 | 36 |

Note: "0" indicates the lack of any significant adhesion between the layers

As is apparent from the data set forth in Table 3, the supported fibrous web assembly of the present invention utilizing a fibrous woven web, rather than a fibrous nonwoven web, exhibited satisfactory permeability and adhesion characteristics.

Example 4

This example further illustrates the satisfactory permeability and adhesion characteristics of an embodiment of the present inventive supported fibrous web assembly under adverse filtration conditions.

The present inventive supported fibrous web assembly of Example 3 (namely, sample 3B) was installed within a conventional filter housing. A hot water suspension containing dissolved sugar and various fibrous and biological debris was pumped through the supported fibrous web assembly for the purpose of dewatering the fluid. The filtration was conducted at a feed pressure of about 69 kPa and a feed temperature of about 50°–70 ° C. Further, the supported fibrous web assembly was oscillated at about 40 Hz about a vertical axis, at an amplitude of about 2.54 cm, to enhance permeate flow. During the course of the filtration, fibrous and biological debris was rejected by the supported fibrous web assembly, thereby causing a fluid with significantly lower turbidity to permeate the assembly. After 4 hours of filtration, there were no indications of delamination. Thus, the present inventive supported fibrous web assembly remains integral even after prolonged exposure to fluids at high pressure, temperature, and vibrational shear.

All of the references cited herein are hereby incorporated in their entireties by reference.

While this invention has been described with an emphasis upon preferred embodiments, it will be apparent to those of ordinary skill in the art that variations of the preferred embodiments can be used and that it is intended that the invention can be practiced otherwise than as specifically described herein. Accordingly, this invention includes all modifications encompassed within the spirit and scope of the invention as defined by the following claims.

What is claimed is:

1. A supported fibrous web assembly comprising (a) a support material, (b) a first fibrous web, and (c) a second fibrous web, wherein said first fibrous web is positioned between and adhered to said support material and said second fibrous web, said first fibrous web is a nonwoven web of multicomponent fibers comprising at least about 10 wt. % of a first polymer and no more than about 90 wt. % of a second polymer such that said second polymer is present on at least a portion of the surface of said multicomponent fibers and has a softening temperature below the softening temperatures of said first polymer, second fibrous web and support material, said supported fibrous web assembly has a water flow rate of at least about 20% of the water flow rate of said second fibrous web alone, and the peel strengths as between said first fibrous web and said support material and as between said first fibrous web and said second fibrous web are at least about 50 kg/m.

2. The supported fibrous web assembly of claim 1, wherein said second fibrous web is a nonwoven fibrous web.

3. The supported fibrous web assembly of claim 2, wherein said first and second polymers are polyolefins and/or polyesters.

4. The supported fibrous web assembly of claim 3, wherein said first polymer is polyester and said second polymer is polyethylene.

5. The supported fibrous web assembly of claim 4, wherein said multicomponent fibers comprise a core of said first polymer and a sheath of said second polymer.

6. The supported fibrous web assembly of claim 2, wherein said supported fibrous web assembly has a water flow rate of at least about 50% of the water flow rate of said second fibrous web alone.

7. The supported fibrous web assembly of claim 6, wherein said supported fibrous web assembly has a water flow rate of at least about 70% of the water flow rate of said second fibrous web alone.

8. The supported fibrous web assembly of claim 7, wherein said supported fibrous web assembly has a water flow rate of at least about 90% of the water flow rate of said second fibrous web alone.

9. The supported fibrous web assembly of claim 2, wherein said support material has a flexural rigidity of at least about 100 times the flexural rigidity of said nonwoven web of multicomponent fibers.

10. The supported fibrous web assembly of claim 9, wherein said support material is a metallic support material.

11. A method of filtering a fluid, which method comprises passing a fluid through the supported fibrous web assembly of claim 2.

12. The method of claim 11, wherein said nonwoven web is subjected to fluid shear forces of at least about 200,000 $sec^{-1}$.

13. A filter element comprising a housing and the supported fibrous web assembly of claim 2.

14. The supported fibrous web assembly of claim 1, wherein said first and second polymers are polyolefins and/or polyesters.

15. The supported fibrous web assembly of claim 14, wherein said first polymer is polyester and said second polymer is polyethylene.

16. The supported fibrous web assembly of claim 15, wherein said multicomponent fibers comprise a core of said first polymer and a sheath of said second polymer.

17. The supported fibrous web assembly of claim 1, wherein said supported fibrous web assembly has a water flow rate of at least about 50% of the water flow rate of said second fibrous web alone.

18. The supported fibrous web assembly of claim 17, wherein said supported fibrous web assembly has a water flow rate of at least about 70% of the water flow rate of said second fibrous web alone.

19. The supported fibrous web assembly of claim 18, wherein said supported fibrous web assembly has a water flow rate of at least about 90% of the water flow rate of said second fibrous web alone.

20. The supported fibrous web assembly of claim 1, wherein said support material has a flexural rigidity of at least about 100 times the flexural rigidity of said nonwoven web of multicomponent fibers.

21. The supported fibrous web assembly of claim 20, wherein said support material is a metallic support material.

22. A method of filtering a fluid, which method comprises passing a fluid through the supported fibrous web assembly of claim 1.

23. The method of claim 22, wherein said nonwoven web is subjected to fluid shear forces of at least about 200,000 $sec^{-1}$.

24. A filter element comprising a housing and the supported fibrous web assembly of claim 1.

25. A method of preparing a supported fibrous web assembly, wherein said method comprises (a) positioning a first fibrous web in contact with and between a support material and a second fibrous web to form a supported fibrous web assembly, wherein said first fibrous web is a nonwoven web of multicomponent fibers comprising at least about 10 wt. % of a first polymer and no more than about 90 wt. % of a second polymer such that said second polymer is present on at least a portion of the surface of said multicomponent fibers and has a softening temperature below the softening temperatures of said first polymer, second fibrous web and support material, (b) subjecting said first fibrous web to a temperature above the softening temperature of said second polymer and below the softening temperatures of said first polymer, second fibrous web and support material, and (c) applying pressure to said supported fibrous web assembly, while said first fibrous web is at a temperature above the softening temperature of said second polymer such that said support material and said second fibrous web are adhered to said first fibrous web, and wherein said supported fibrous web assembly has a water flow rate of at least about 20% of the water flow rate of said second fibrous web alone and peel strengths as between said first fibrous web and said support material and as between said first fibrous web and said second fibrous web of at least about 50 kg/m.

26. The method of claim 25 wherein said second fibrous web is a nonwoven fibrous web.

27. The method of claim 26, wherein said method further comprises subjecting said first fibrous web to a temperature and pressure sufficient to render a portion of said first fibrous web impermeable to fluid flow.

28. The method of claim 27, wherein said supported fibrous web assembly has edges and at least a portion of said edges are fluid-tight sealed by said impermeable portion of said first fibrous web.

* * * * *